United States Patent
Höpfner

(10) Patent No.: US 10,926,675 B2
(45) Date of Patent: Feb. 23, 2021

(54) VEHICLE SEAT

(71) Applicant: Brose Fahrzeugteile GmbH & Co. KG, Coburg, Coburg (DE)

(72) Inventor: Andreas Höpfner, Hildburghausen (DE)

(73) Assignee: Brose Fahrzeugteile SE & Co. KG (Coburg), Coburg (DE)

( * ) Notice: Subject to any disclaimer, the term of this patent is extended or adjusted under 35 U.S.C. 154(b) by 0 days.

(21) Appl. No.: 16/689,126

(22) Filed: Nov. 20, 2019

(65) Prior Publication Data

US 2020/0171986 A1 Jun. 4, 2020

(30) Foreign Application Priority Data

Nov. 29, 2018 (DE) ...................... 10 2018 130 323.8

(51) Int. Cl.
| | | |
|---|---|---|
| *B60N 2/427* | (2006.01) | |
| *B60N 2/42* | (2006.01) | |
| *B60N 2/433* | (2006.01) | |
| *B60N 2/68* | (2006.01) | |

(52) U.S. Cl.
CPC ....... *B60N 2/42745* (2013.01); *B60N 2/4214* (2013.01); *B60N 2/42709* (2013.01); *B60N 2/433* (2013.01); *B60N 2/688* (2013.01)

(58) Field of Classification Search
CPC .............. B60N 2/42745; B60N 2/4214; B60N 2/42709; B60N 2/433
USPC ............................. 297/216.1, 216.15, 284.11
See application file for complete search history.

(56) References Cited

U.S. PATENT DOCUMENTS

| | | | | |
|---|---|---|---|---|
| 6,033,017 A | * | 3/2000 | Elqadah | B60N 2/4214 |
| | | | | 297/216.1 |
| 6,048,034 A | * | 4/2000 | Aumont | B60N 2/1803 |
| | | | | 297/216.1 |
| 2010/0052378 A1 | | 3/2010 | Marriott et al. | |
| 2017/0259713 A1 | | 9/2017 | Kostin | |

(Continued)

FOREIGN PATENT DOCUMENTS

| | | |
|---|---|---|
| CN | 104648194 A | 5/2015 |
| CN | 106828220 A | 6/2017 |

(Continued)

OTHER PUBLICATIONS

Office Action for corresponding Chinese Application No. 201911206817.3 dated Aug. 5, 2020 and its English translation.

*Primary Examiner* — Anthony D Barfield

(74) *Attorney, Agent, or Firm* — Renner, Otto, Boisselle & Sklar, LLP

(57) ABSTRACT

A vehicle seat comprising a seat member and a backrest, wherein a belt connection is attached to or integrated into the upper end of the backrest, a mechanical coupling device is provided for coupling the backrest to the assembly for adjustment of the inclination of the seat member in the event of a collision. A triggering threshold is defined wherein the backrest is decoupled from the assembly under normal operating conditions, and wherein in a collision, when the triggering threshold is exceeded, the backrest pivots forwards and is finally coupled via the mechanical coupling device to the assembly, so that further pivoting of the backrest forwards triggers the assembly and causes the front region of the seat member facing away from the backrest to pivot upwards about a transverse axis.

12 Claims, 13 Drawing Sheets

(56) References Cited

U.S. PATENT DOCUMENTS

2018/0141476 A1     5/2018  Tobata et al.
2019/0308534 A1 *  10/2019  Rosenberg ......... B60N 2/42745

FOREIGN PATENT DOCUMENTS

| DE | 102004049961 A1 |   | 4/2006 | |
|----|-----------------|---|--------|---|
| DE | 102008003720 A1 |   | 7/2009 | |
| DE | 102011112259 A1 |   | 3/2013 | |
| DE | 102013007710 A1 |   | 11/2014 | |
| DE | 102018204461 A1 |   | 10/2018 | |
| EP | 1916440 A2 |   | 10/2007 | |
| GB | 1353403 A | * | 5/1974 | ......... B60N 2/42736 |
| JP | 200912545 A |   | 1/2009 | |

\* cited by examiner

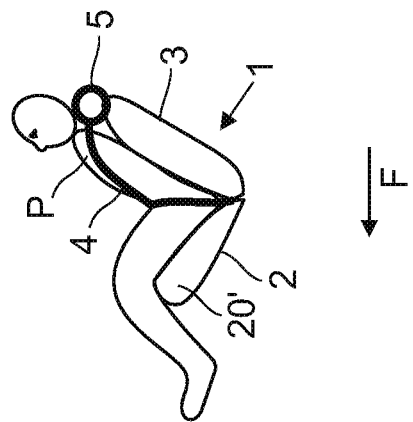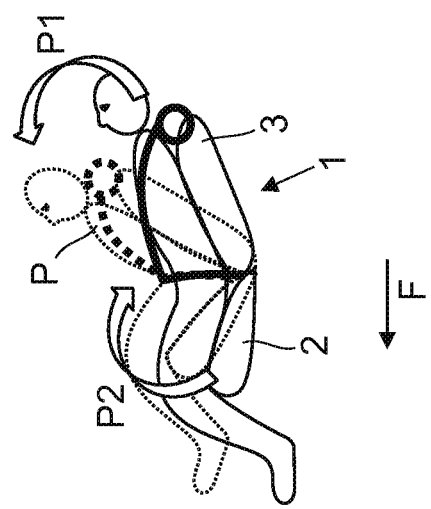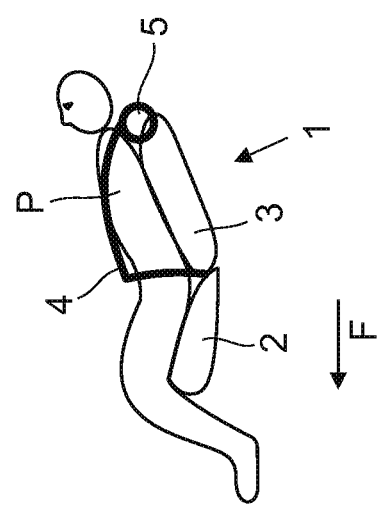

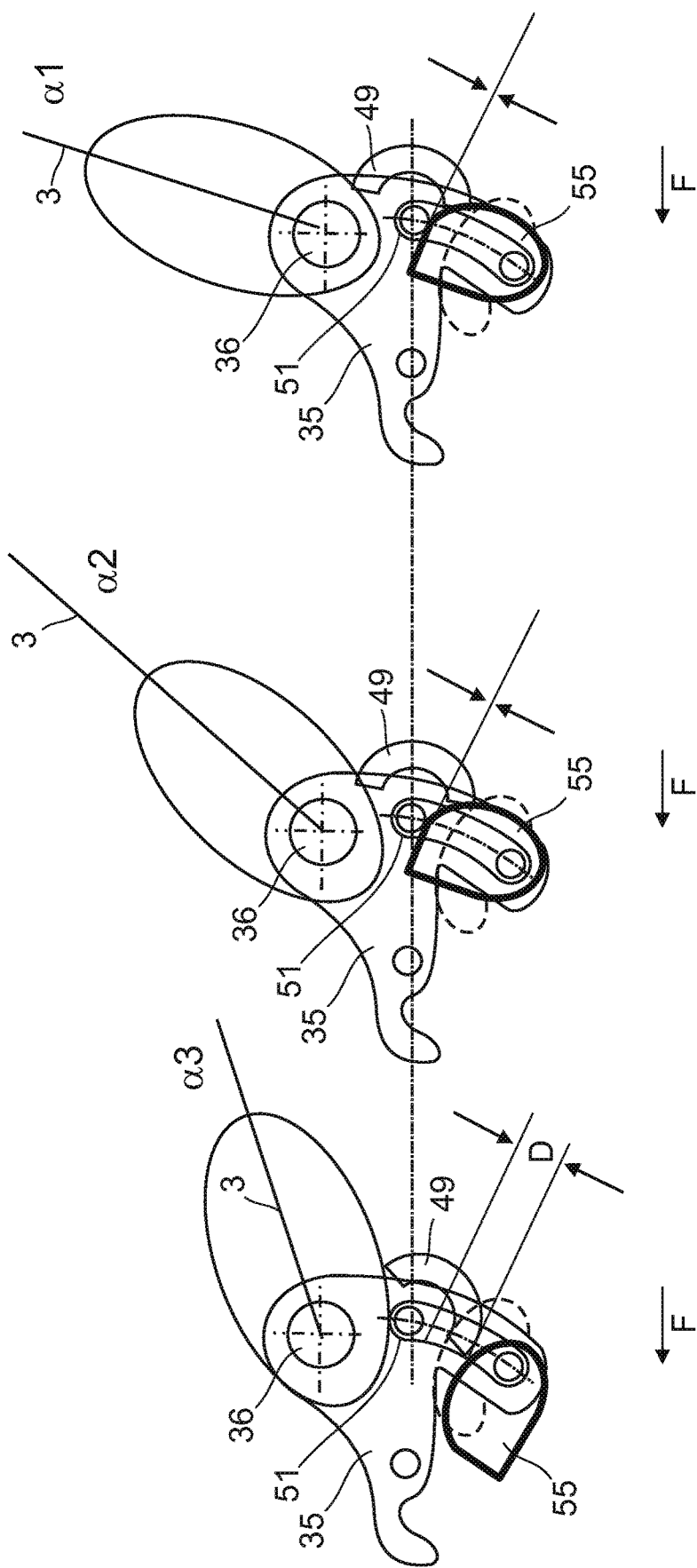

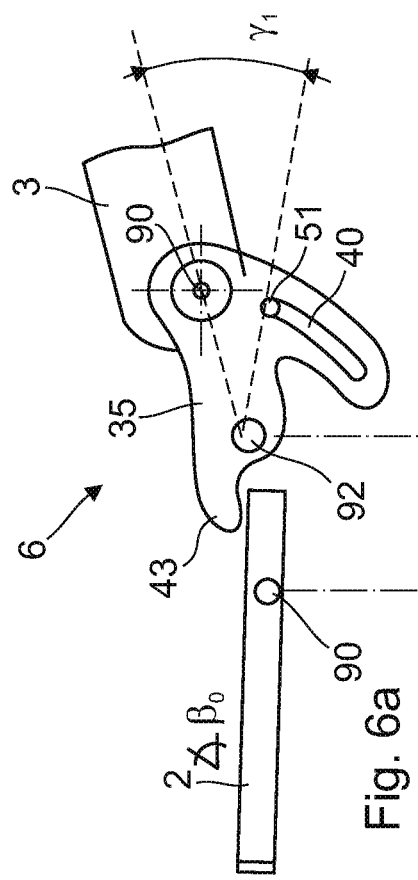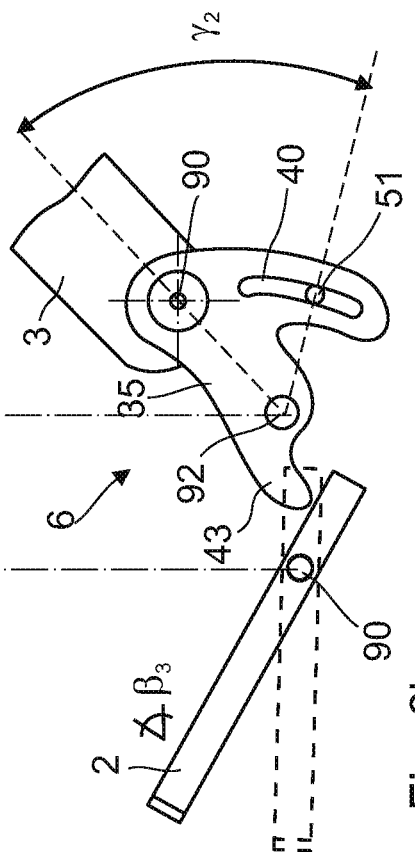

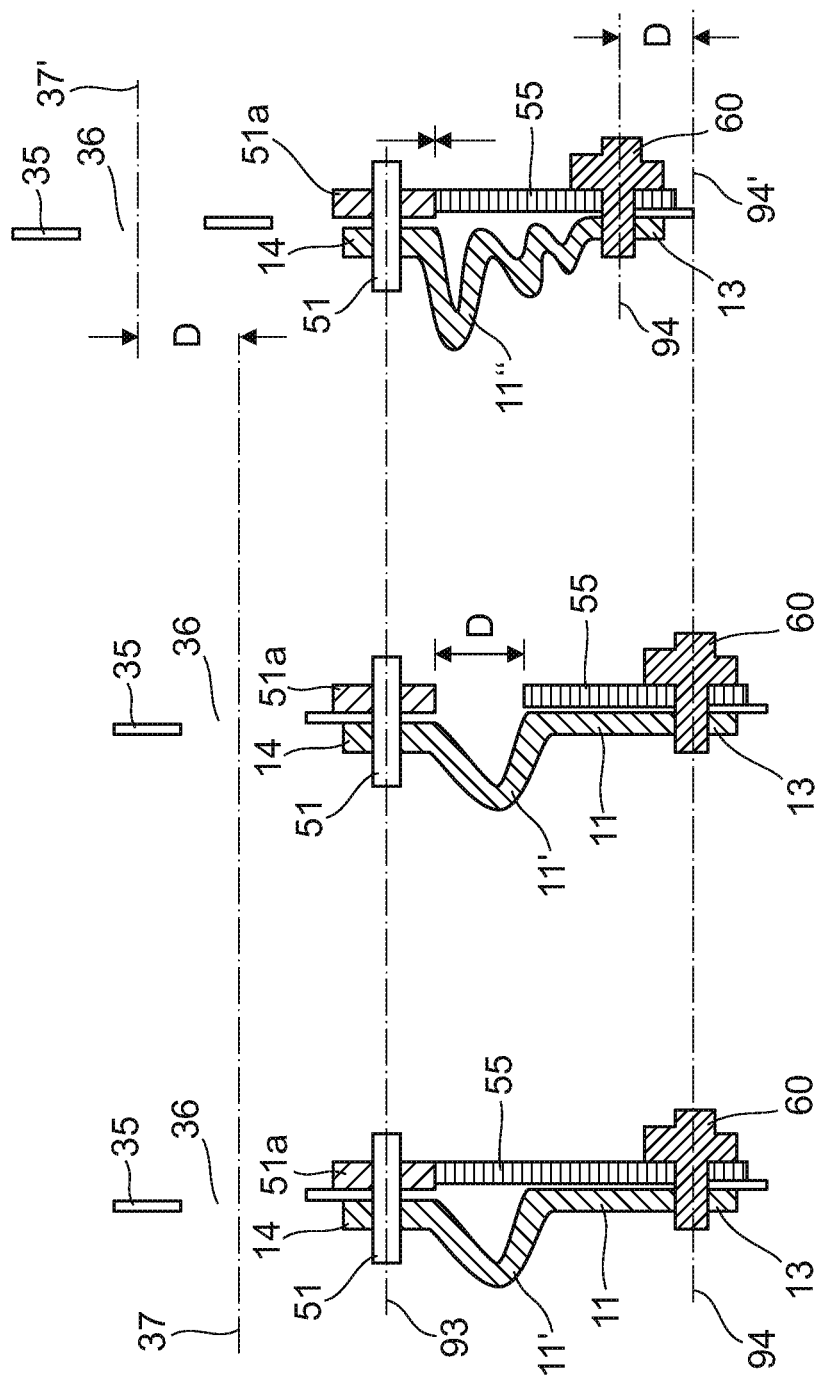

VEHICLE SEAT

The present application claims the priority of German patent application no. 10 2018 130 323.8 'Vehicle Seat', filed on 29 Nov. 2018, the whole content of which is hereby expressly incorporated by way of reference.

FIELD OF THE INVENTION

The present invention generally relates to a vehicle seat, in particular for motor vehicles, and relates in particular to a vehicle seat comprising a seat member and a backrest, wherein the backrest can be pivoted into a resting or reclining position and which has a mechanism configured such that in the event of a crash, driven exclusively by the high accelerations and forces occurring in the event of a crash, first the backrest is automatically pivoted forward into an upright position and the forward swing of this pivoting of the backrest is additionally used to induce, in a second stage, an upward pivoting of a front region of the seat member facing away from the backrest in order to achieve a more favorable seating position for a vehicle occupant and thus further reduce damage to the vehicle occupant.

BACKGROUND OF INVENTION

When designing vehicles, sufficient account must be taken of measures for occupant safety. In the case of vehicle seats in the front area of vehicles, this is primarily achieved by means of front systems for occupant protection, such as belt systems, belt tensioners and front airbags, which are intended to retain occupants in a relatively late stage of a crash and to provide additional protection in particular for the head and neck area. Further protective measures are so-called seat-based restraint devices, which are coupled to a seat rail module and, in the event of a crash, give way to a crash-induced momentum in a controlled manner and with the absorption of energy.

Safety relevant adjustment parameters of a vehicle seat may be in particular: an angle of inclination of the backrest of the vehicle seat, an angle of inclination of a seat surface of the vehicle seat; a height level of a seat surface of the vehicle seat (e.g. an excessive lowering of the seat surface, e.g. into a relax position of the vehicle seat, may entail the risk of the vehicle occupant slipping through a lap belt ('so-called submarining').

While driving, the backrest of a seat of a co-driver is often swiveled back into a resting or reclining position. With the increasing use of autonomous motor vehicles, it can be expected that the driver also swivels the backrest far back into a resting or reclining position while driving in order to rest while driving. This poses new challenges for measures for occupant safety.

FIG. 1a shows a vehicle seat 100 according to the prior art which is adjusted for optimum performance of a seat belt 103. For this purpose, the backrest 102 is inclined relatively upright and the seat member 101 is also swiveled slightly upwards at an end (hereinafter front region) facing away from the backrest 102.

FIG. 1b shows the vehicle seat of FIG. 1a whose backrest 102 is swiveled far backwards into a resting or reclining position. In particular the upper body of the occupant P' is in an unfavorable position relative to the seat belt 103. Thus, the spine extends essentially in the direction of compression, so that in the event of a crash not only a slipping of the vehicle occupant under a lap belt is to be feared ('submarining'), but also massive damage to the spine may occur.

If, starting from the position shown in FIG. 1b, in the event of a crash only the seat member 101 were to be swiveled vigorously upwards at the front end facing away from the backrest 102, the risk of a compression of the spine would remain. Nevertheless, the upper body and pelvis of the occupant P' would not be aligned in the direction of the load, so that in particular the risk of damage to the organs of the occupant P' would remain.

DE 10 2018 204 461 A1 discloses a vehicle seat, comprising a seat member and a backrest, wherein at least the backrest can be adjusted into a resting or reclining position and wherein at least the seat member with a front region facing away from the backrest is pivoted upwards (or can be pivoted upwards) about an axis extending in parallel with the transverse direction of the vehicle in the event of a crash. An energy absorption device is provided which acts between the seat member and the vehicle structure in the longitudinal direction of the seat. The combination of the seat part, which is swiveled or pivoted upwards with its front region, and the energy absorption device ensures, on the one hand, that the person strapped to the vehicle seat in a reclining position cannot slip under the seat belt because the seat member is swiveled upwards, and, on the other hand, that the forces acting on the body in the event of a frontal collision are significantly reduced by the energy absorption device.

However, because the backrest remains swiveled backwards in the resting or reclining position in the event of a crash, the risks described above with reference to FIG. 1b still exist.

DE 10 2008 003 720 A1 discloses a vehicle seat in which, starting from a resting or reclining position, the backrest together with the seat member can be pivoted about an axis transverse to the longitudinal direction of the vehicle.

DE 10 2013 007 710 A1 discloses a vehicle seat having an airbag provided in a seat cushion, which is activated and released depending on an angle of inclination of the backrest.

SUMMARY OF INVENTION

It is an object of the present invention to provide simple, reliable and effective measures for occupant safety, in particular for the new seating positions of a driver or co-driver that will arise in the future, for example in 'autonomous driving' situations. In particular, the present invention aims to provide an improved vehicle seat having a low-cost design that enables reliable and effective occupant safety measures over a very wide adjustment range of the vehicle seat, especially when the backrest is inclined to a resting or reclining position.

According to the present invention, there is provided a vehicle seat, comprising a seat member and a backrest, wherein a belt connection is attached to or integrated into an upper end of the backrest, the backrest can be adjusted about an axis extending in parallel with a vehicle transverse direction for adjusting the inclination of the backrest into a resting or reclining position, and an assembly for adjustment of the inclination of the seat member is provided so that, in the event of a collision, the seat member with a front region facing away from the backrest can be pivoted upwards about an axis extending parallel to the transverse direction of the vehicle for adjusting of the inclination of the seat member.

According to the present invention, a mechanical coupling device is provided for coupling the backrest to the assembly for adjustment of the inclination of the seat member in the event of a collision, wherein the mechanical coupling device defines a triggering threshold, (a) such that the backrest is decoupled from the assembly for adjustment of the inclination of the seat member under normal operating conditions when the triggering threshold is not exceeded; and (b) such that in the event of a collision, when the triggering threshold is exceeded, the backrest is pivoted forwards and is finally coupled to the assembly for adjustment of the inclination of the seat member via the mechanical coupling device, so that a further pivoting of the backrest forwards triggers the assembly for adjustment of the inclination of the seat member and causes the front region of the seat member facing away from the backrest to pivot upwards about the axis.

The design of the mechanical coupling device allows the vehicle seat to be freely adjusted under normal conditions. In particular, the backrest can be freely swung back from a normal (upright) position to a resting or reclining position far to the rear and from this resting or reclining position back to the normal (upright) position.

Due to the belt connection, which is directly attached to the upper end of the backrest or integrated into the backrest, according to the present invention a relatively high backrest erection torque is available at an early stage in the event of a crash. In the event of a crash, the backrest can therefore be quickly swung forward from a resting or reclining position swung backwards to an upright position in the first stage, when high acceleration forces act on the vehicle occupants, which in turn are transferred to the backrest via the belt connection, to thereby reduce the risk of a compression of the spine.

Due to the design of the mechanical coupling device, it is also possible to ensure that in the event of a crash the backrest is coupled with an assembly for adjustment of the inclination of the seat member in a second stage. This second stage in the event of a crash is preferably initiated with a massive reduction of kinetic energy of the system consisting of the backrest and vehicle occupant strapped to it, for which purpose particularly a plastic deformation of a deformation member provided in the mechanical coupling device is used.

Due to the resulting very stiff coupling of the backrest with the assembly for adjustment of the inclination of the seat member, the front region of the seat pan, which faces away from the backrest, can then be swiveled up in a final stage, which leads to the thighs of the vehicle occupant being slightly inclined against the direction of travel and thus results in improved occupant restraint and in a reduction of the risk that the pelvis of the vehicle occupant immerses under a lap belt ('anti-submarining effect').

According to the present invention, the coupling device acts in a purely mechanical way and is driven by the very high accelerations and forces that occur in the event of a crash. As long as the triggering threshold of the mechanical coupling device is not exceeded under normal operating conditions, the entire sequence of movements is reversible.

According to a further embodiment, the characteristics of the mechanical coupling device may be specified in an advantageously simple manner by the geometry and material characteristics of a deformation member provided in it. In particular, the deformation member may define a triggering threshold.

The mechanical characteristics of the deformation member may also define the stiffness of the mechanical coupling of the backrest to the assembly for adjustment of the inclination of the seat member in an advantageously simple manner. If the triggering threshold is exceeded in the event of a crash, the deformation member is unlocked, in particular by means of a locking cam disc, which causes the mechanical coupling of the backrest to the assembly for adjustment of the inclination of the seat member to be switched on abruptly. In the event of a crash, the deformation member can considerably reduce impact energy, even if the backrest was initially swiveled far back into a resting or reclining position at the time of a crash.

OVERVIEW ON DRAWINGS

In the following, the invention will be described in an exemplary manner and with reference to the enclosed drawings, from which additional features, advantages and problems to be solved may be derived by the person skilled in the art, and wherein:

FIGS. 2a-2c show the basic principle of the automatic adjustment of a vehicle seat according to the present invention induced by a crash;

FIGS. 5a to 5c show the positional relationship between a locking cam disc and a deformation member for locking and releasing the deformation member as a function of the inclination of the backrest in a vehicle seat according to the present invention;

FIG. 6a shows in an enlarged partial side view the backrest fitting according to FIG. 4a at an angle of inclination of the backrest for which an assembly for adjustment of the inclination of the seat member is not activated;

FIG. 6b shows in an enlarged partial side view the backrest fitting according to FIG. 4a in the event of a crash, if the angle of inclination of the backrest is sufficient to activate an assembly for adjustment of the inclination of the seat member;

FIGS. 8a to 8c show in a schematic view from behind the mechanical coupling device in three different states;

In the drawings, identical reference numerals designate identical or essentially equivalent elements or groups of elements.

DETAILED DESCRIPTION OF PREFERRED EMBODIMENTS

Figure 1B:
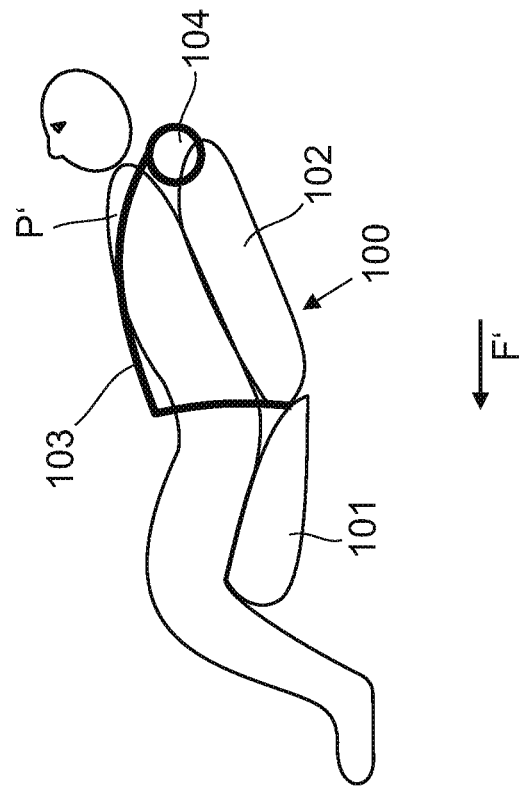
FIG. 1b is schematic side view of the vehicle seat according to the prior art in a reclining position.
Figure 1A:
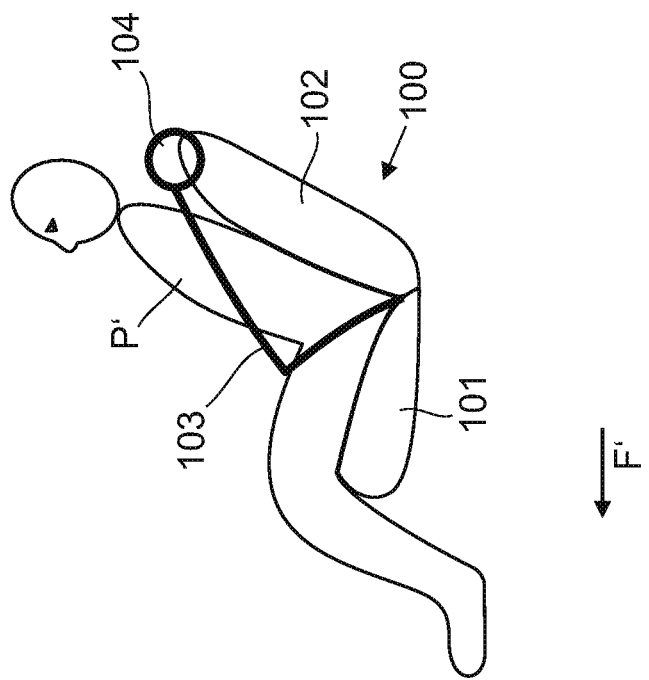
FIG. 1a is a schematic side view of a vehicle seat according to the prior art in an upright driving position.

In the following, FIGS. 2a to 2c first describe the general basic principle of a vehicle seat 1 according to the present invention. The vehicle seat comprises a backrest 3 and a seat member 2 with a seat pan with upholstery. The direction of travel is indicated by the arrow F. Seat member 2 is connected to a vehicle floor via a seat base (not shown). For the following explanations it is assumed that the vehicle seat is designed as a so-called belt integral seat, in which an upper belt exit point 5 of the safety belt 4 is attached to the upper end of the backrest 3 or is directly integrated into it. According to FIG. 2a, the backrest 3 is swiveled to the rear into a resting or reclining position, counter to the direction of travel F. The backrest 3 is then in a resting or reclining position. The haunches of the person P rest on the seat member 2. The backrest 3 can always be swiveled completely or almost completely to the rear into a horizontal position.

In the event of a collision (crash), the person P is accelerated forwards, in the direction of travel F. The person P is then moved to the front. The person P is restrained by the tightening or already pre-tensioned seat belt 4. This causes a force to act on the seat belt 4 and on the upper belt exit point 5, which causes the backrest 3 to swivel upwards, as indicated by arrow P1 in FIG. 2b. The force for erecting or raising the backrest increases rapidly due to the increasing backrest erection angle. Towards the end of the first stage P1, when the backrest 3 is relatively upright, a mechanical coupling device is triggered which causes a direct mechanical coupling of the backrest 3 with the seat member 2. In a second stage P2, the relatively high momentum of the backrest 3 with the person P restrained on it causes the seat member 2 to swivel upwards at the front end facing away from the backrest 3, as indicated by the arrow P2 in FIG. 2b, wherein this movement is driven by the further forward swiveling of the backrest 3. The seat member 2 is coupled to an assembly 7 for adjustment of the inclination of the seat member 2 which drives the swiveling of seat member 2 upwards at the front end facing away from the backrest 3. In the event of a crash, this assembly 7 for adjustment of the inclination of the seat member 2 is actuated and driven forward by further swiveling of the backrest 3 in the direction of travel F, wherein the torque of the backrest is strongly reduced by simultaneous plastic deformation of a deformation member, as outlined below in more detail.

Under normal operating conditions, in the absence of a collision (crash), the seat member 2 is locked to a seat base (not shown) so that seat member 2 is essentially rigidly connected to the seat base and the vehicle floor. Under normal operating conditions, the assembly 7 for adjustment of the inclination of the seat member 2 does not abut directly to the underside of seat member 2. Rather, the assembly 7 for adjustment of the inclination of the seat member 2 and the underside of seat member 2 are spaced apart to each other to ensure that, under normal operating conditions, seat member 2 is locked to the seat base.

In a first transition stage between the afore-mentioned first stage P1 and the afore-mentioned second stage P2, a mechanical coupling device coupling the backrest to the assembly 7 for adjustment of the inclination of the seat member 2 first acts on the assembly 7 for adjustment of the inclination of the seat member 2 such that locking of the seat member 2 with the seat base is released but that the seat member remains locked to the seat base. In a subsequent second transition stage between the afore-mentioned first stage P1 and the afore-mentioned second stage P2, the locking of the seat member to the seat base is released by adjustment of the assembly 7 for adjustment of the inclination of the seat member 2.

The adjustment movements in the two transition stages as well as in the second stage P2 are driven by further swiveling the backrest 3 forwards. However, the further swiveling (pivoting) movement of the backrest 3 during the two transition stages and in particular during the second stage P2 is increasingly slowed down by plastic deformation of a deformation member, as explained in more detail below.

Finally, the position of FIG. 2c is reached, in which the backrest 3 is relatively upright and the front region 20' of the seat member 2 facing away from the backrest 3 is swiveled upwards. The inclination angles of seat member 2 and backrest 3 can be properly defined by the general configuration of the vehicle seat 1 and of the mechanical coupling device in order to ensure an optimum occupant protection, in particular an adequate protection against spinal compression, slippage of the pelvis of the occupant P under a pelvic belt and damage to the internal organs of the occupant P.

A deformation member is provided in the mechanical coupling device which is plastically deformed when the cycle described above is carried out and is thus available as a crash indicator. Vehicle seat 1 is then ready for operation again after a crash, at least after replacement of the deformation member.

Figure 3:
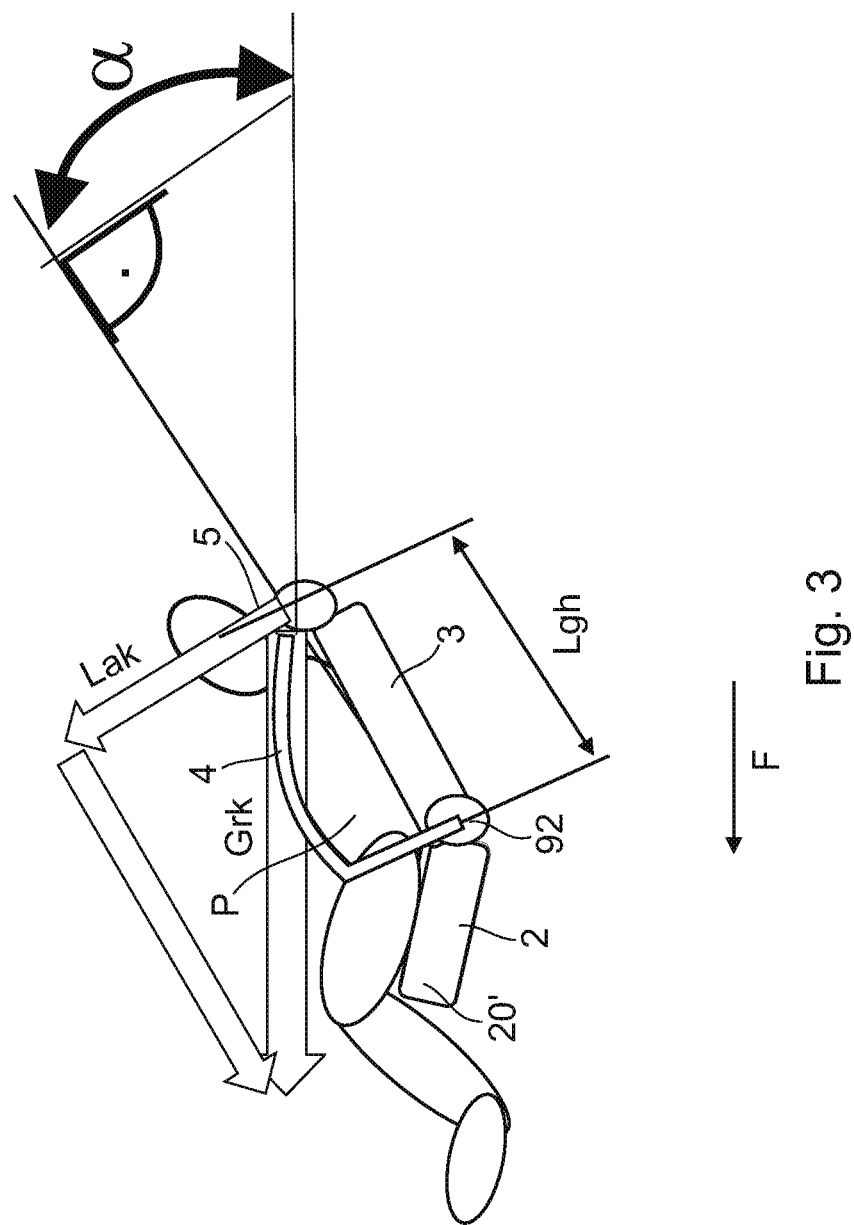
FIG. 3 shows the predominant forces with force decomposition in a vehicle seat according to the present invention for the case of a frontal crash.

Referring to FIG. 3, the forces prevailing in the event of a crash shall be analyzed first. Here, it is assumed that the backrest 3 is swiveled backwards relatively far, the angle of the backrest a relative to the horizontal direction thus being relatively small. In the event of a crash, the arrow Grk indicates the belt reaction force, resulting from the surface load of the belt system 4, projected into the upper belt exit point 5. The inclination of the backrest 3 defines the decomposition of forces into a backrest erecting force Lak and a backrest thrust force to which applies the following:

$$\sin \alpha = Lak/Grk$$

This results in a backrest erecting torque Lam over the backrest belt height Lgh, corresponding to the distance of the upper belt exit point 5 to the main axis of rotation 92 of the backrest 3 in relation to the seat member 2:

$$Lam = Grk * \sin \alpha * Lgh$$

The backrest erection torque Lam thus corresponds to a curve which is proportional to the sine function of the backrest erection angle sin α. The further the backrest 3 is upright (α being relatively large), the greater the backrest erecting torque Lam. The backrest erection angle α will only be relatively large at a relatively late point after the beginning of the crash, i.e. when the momentum of the backrest 3 with the person P restrained on it is also relatively large.

As outlined below, this high momentum can be used according to the present invention for triggering and adjusting the assembly 7 for adjustment of the inclination of the seat member 2 in order to cause the seat member 2 to swivel upwards in the front region 20' facing away from the backrest 3, as described below.

Figure 4A:
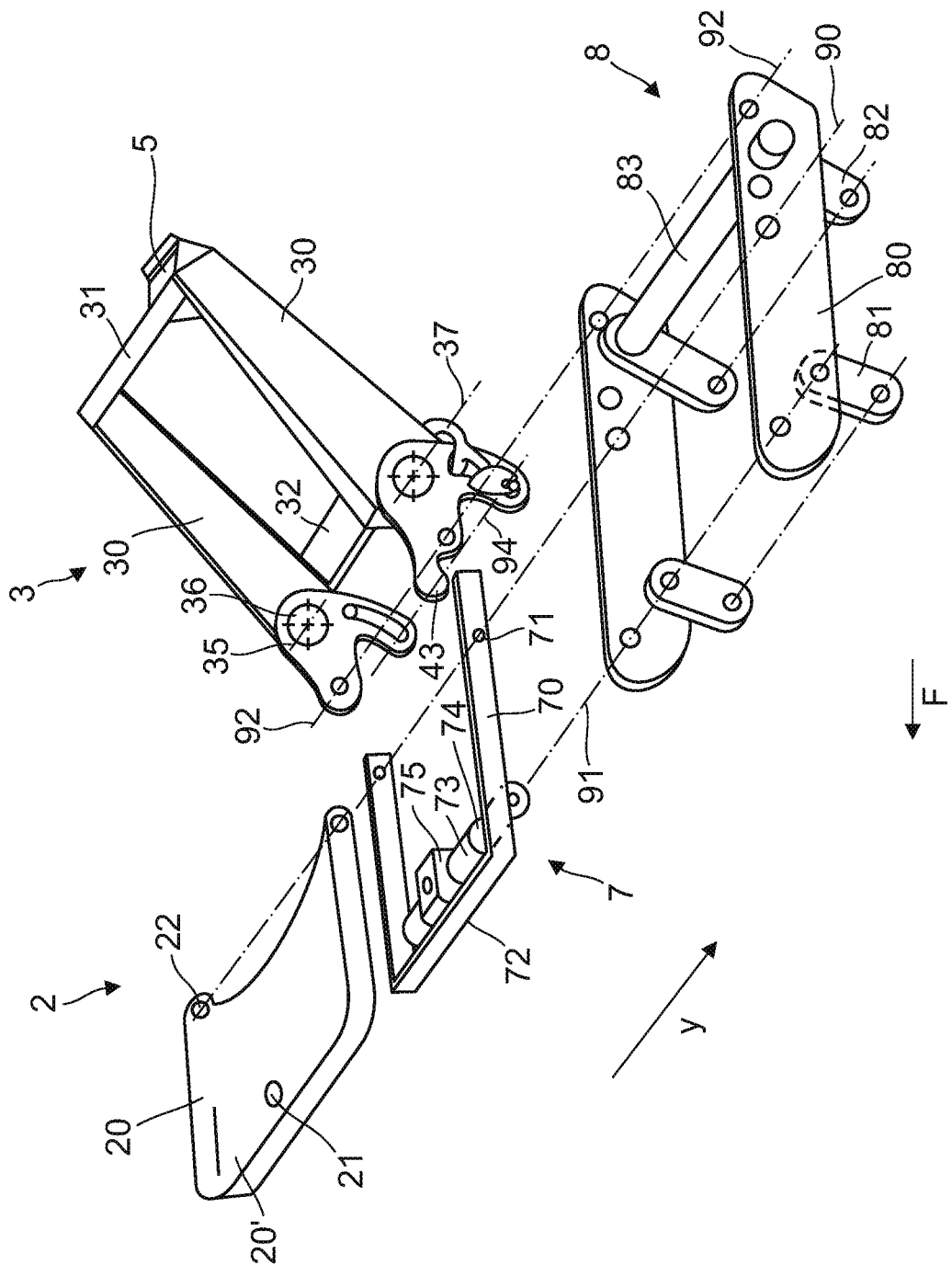
FIG. 4a shows in a perspective exploded view schematically the structure of a vehicle seat according to the present invention.

FIG. 4a schematically shows the structure of a vehicle seat according to the present invention in a perspective exploded view. It comprises a backrest 3, a seat base 8 for fixing the vehicle seat to an upper rail of a longitudinal adjustment unit not shown, the lower rail of which is in turn connected to the vehicle floor, an assembly 7 for adjustment of the inclination of the seat member 2 and a seat member 2 having a seat pan 20 provided thereon with upholstery (not shown).

The backrest 3 comprises in the known manner a frame formed by the side parts 30, an upper traverse bracket 31 and a lower traverse bracket 32 each extending in the transverse direction y of the vehicle. The upper belt exit point 5 is provided at the upper end of the side part 30 that faces the outside or door of the vehicle or that is integrated in this region into the backrest 3 frame.

Figure 4B:
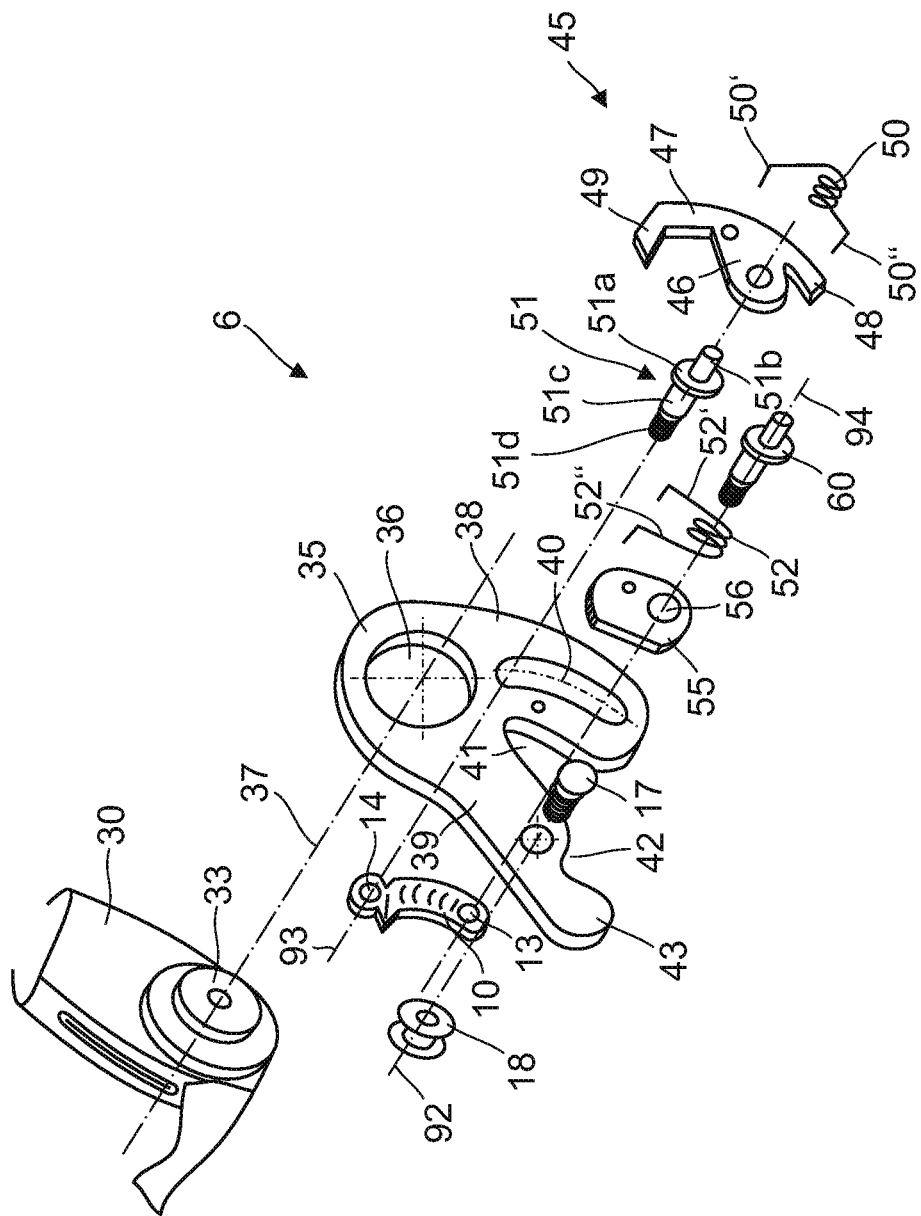
FIG. 4b shows in a perspective exploded view and in an enlarged view details of the vehicle seat according to the present invention in the region of the backrest fitting.

At the lower end of the side parts 30, backrest fittings 35 are provided to guide the adjustment of the inclination of the backrest 3. These backrest fittings 35 basically may be configured differently, as shown in FIG. 4a. For example, only the backrest fitting 35 facing the vehicle door (out of the vehicle) may be configured for coupling with the assembly 7 for adjustment of the inclination of the seat member 2. The backrest 3 may be swiveled about the axis 37 for adjustment of the inclination of the backrest 3, which runs through an opening 36 in which a stub axle or recliner 33 is mounted at the lower end of the side part 30, as shown in FIG. 4b. The backrest 3 can be swiveled about the axis 37 for adjustment of the inclination of the backrest 3 in order to adopt a desired backrest erection angle α. For comfort adjustment for the respective vehicle occupant, the backrest 3 can always be swiveled forwards to a practically vertical upright position in the direction of travel F or can be swiveled backwards counter to the direction of travel F to a resting or reclining position with a relatively small backrest erection angle α, as schematically shown in FIG. 2a. In the resting or reclining position, the backrest erection angle α may be practically zero.

In the event of a crash, if a triggering threshold of a mechanical coupling device to be described later (see FIG. 4b) is exceeded, backrest 3 and backrest fitting 35 are swiveled together forward about the main axis of rotation 92. As can be seen from FIG. 4a, the main axis of rotation 92 and the axis 37 are in parallel with each other and spaced apart for adjustment of the inclination of backrest 3.

The axis 37 for adjustment of the inclination of backrest 3 is located on a first side of the main axis of rotation 92. On the side of the main axis of rotation 92 opposite this first side, an actuating end 43 is provided on the backrest fitting 35, which acts on the rear end of a bracket 70 for inclining seat pan in the event of a crash and actuates it in order to adjust the assembly 7 for adjustment of the inclination of the seat member 2, as shown below. As shown in FIG. 4a, it may be sufficient if only one of the two backrest fittings 35, namely the backrest fitting 35 located on the side of the upper belt exit point 5 or on the side facing the vehicle door, has such a front actuating end 43. The length of the front end of the backrest fitting 35 facing the inside of the vehicle is thus shown to be shorter in FIG. 4a.

Under normal operating conditions, when the triggering threshold of the mechanical coupling device is not exceeded, i.e. in particular in the case of a comfort adjustment of the backrest for the respective vehicle occupant, the front actuating end 43 of the backrest fitting 35 is preferably arranged at a distance from the opposite rear end of the bracket 70 for inclining seat pan, wherein, for example, the bracket 70 for inclining seat pan is not adjusted to the bracket 35B for inclining seat pan. Mechanical tolerances, but also vibrations or the like acting during normal driving can be compensated in order to prevent accidental actuation and triggering of the assembly 7 for adjustment of the inclination of the seat member 2.

Only in the event of a collision, when the triggering threshold of the mechanical coupling device is exceeded, is the backrest 3 coupled to the assembly 7 for adjustment of the inclination of the seat member 2 via the mechanical coupling device in such a manner that an adjustment of the inclination of the backrest 3 further forward triggers and adjusts the assembly 7 for adjustment of the inclination of the seat member 2 to finally cause the front region 20' of the seat member 2 facing away from the backrest 3 to pivot upwards about the main axis of rotation 92 for an adjustment of the inclination of the seat member.

According to FIG. 4a the assembly 7 for adjustment of the inclination of the seat member 2 comprises a U-shaped frame formed by the two brackets 70 for inclining seat pan extending parallel to the direction of travel F and by a transverse bracket 72 connecting the two brackets 70 for inclining seat pan. This U-shaped frame can be swiveled upwards at the rear end of the bracket 70 for inclining seat pan at the two pivot points 71 about an axis 90 for adjustment of the inclination of the seat member.

On the underside of the seat pan 20 there is a connecting member 21 in the front region 20' for connecting the seat pan 20 to the seat base 8. More precisely, a support or traverse bracket 73 extends in the transverse direction y of the vehicle, which is fastened to beams 74 which are pivotally mounted on the axis 91 on the side parts 80 of the seat base 8 and, due to the weight force, press the traverse bracket 73 permanently forward, in the direction F, against the traverse bracket 72 of the assembly 7 for adjustment of the inclination of the seat member 2. Below the connecting member 21, the traverse bar 73 is enclosed by a locking claw 75, which is connected to the seat pan 20 of seat member 2 via the connecting member 21.

Figure 7A:
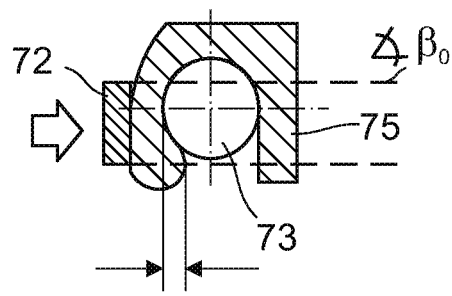
FIGS. 7a to 7d show stages of unlocking an assembly for adjustment of the inclination of the seat member according to the present invention in the event of a crash.

FIG. 7a shows this arrangement under normal operating conditions in a schematic cross-sectional view, if the triggering threshold of the mechanical coupling device is not exceeded, i.e. if there is no collision (crash). In this state, the locking claw 75 embraces the traverse bracket 73. The locking claw 75 and traverse bracket 73 have corresponding profiles for mutual locking. In this condition, the locking of the traverse bracket 73 by the locking claw 75 is blocked by the traverse bracket 72 of the assembly 7 for adjustment of the inclination of the seat member 2 pressing against the front end of the locking claw 75, or at least being located a short distance from it, so that unlocking is reliably prevented. The locking of the locking claw 75 cannot be released in this condition.

Figure 7B:
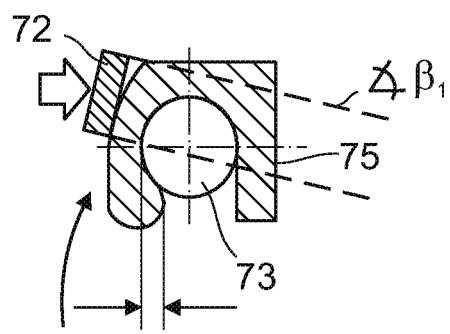

In a first stage (first transition stage) of unlocking the locking claw 75, the traverse bracket 72 of the assembly 7 for adjustment of the inclination of the seat member 2 is swiveled upward, as shown in FIG. 7b. In this state the locking of the traverse bracket 73 is only maintained due to the stability of the locking claw 75, especially due to its elastic characteristics. For this purpose, the cheeks of the locking claw 75 have a certain elasticity, for example they may be made of plastic or sheet metal with suitable elasticity.

Figure 7C:
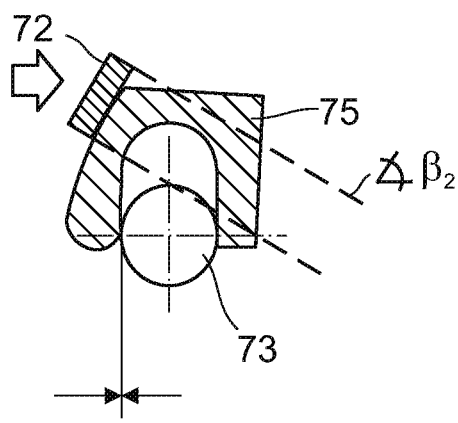

As the traverse bracket 72 of the assembly 7 for adjustment of the inclination of the seat member 2 continues to swivel upwards, a stage of lifting the locking claw 75 finally begins, so that the coupling between the seat pan with the seat base frame via the locking claw 75 and the traverse bracket 73 becomes weaker and weaker, as shown in FIG. 7c.

Figure 7D:
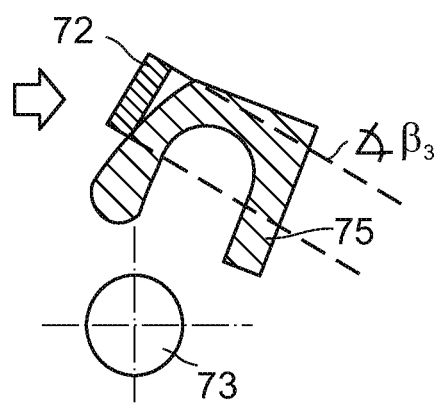

As the traverse bracket 72 of the assembly 7 for adjustment of the inclination of the seat member 2 continues to swivel upwards when regions of the assembly 7 for adjustment of the inclination of the seat member 2 come into contact with the underside of the seat pan, the locking claw 75 finally releases the traverse bracket 73 completely, as shown in FIG. 7d, so that the coupling of the seat pan to the seat base is then completely released and the seat pan is swiveled upwards at its front region facing away from the backrest as the traverse bracket 72 of the assembly 7 for adjustment of the inclination of the seat member 2 continues to swivel upwards.

In order to ensure that under normal operating conditions, when the triggering threshold of the mechanical coupling device is not exceeded, the seat pan is coupled to the seat base in a sufficiently stable manner and that the locking of the locking claw 75 with the traverse bracket 73 can be gradually released in the manner described above, according to the present invention the underside of the seat pan is arranged at a sufficient vertical distance from the traverse bracket 72 of the assembly 7 for adjustment of the inclination of the seat member 2.

Under normal operating conditions, the backrest erection angle can be freely adjusted by means of a standard mechanism for adjustment of the inclination of the backrest without exceeding the triggering threshold of the mechanical coupling device. This adjustment can always be carried out by a person by manual adjustment. In principle, however, this adjustment may also be effected by a motor-driven adjustment as long as the coupling of the drive or gearbox provided for this purpose with the backrest can be released sufficiently quickly in the event of a crash, e.g. by the breakaway of a breakaway part provided on the drive or gearbox. The following explanations are focused on the mode of operation in the event of a crash when the triggering threshold of the mechanical coupling device is exceeded.

FIG. 4b shows in a perspective exploded view on a larger scale further details of a mechanical coupling device 6 according to the present invention in the region of the backrest fitting 35. The backrest fitting 35 has a main body with opening 36, from which a first arm 38 and a second arm 39 project. The front end of the second arm 39 is extended to a rounded actuating end 43, as outlined above, which is located on a first side of the main axis of rotation 92. On the opposite second side of the main axis of rotation 92 is the semi-circular second arm 38, in which there is formed a guide recess 40 below the opening 36, which is of semicircular shape corresponding to a radius corresponding to the distance from the centre of the opening 36 to the main axis of rotation 92 about which the backrest fitting 35 and the backrest (not shown) are pivoted forward in the event of a crash.

A bolt 60 extending through the guide recess 40 connects the locking cam disc 55 on a first side (facing the vehicle door) of the backrest fitting 35 to the first end 13 of the deformation member 10 on the opposite second side of the backrest fitting 35. The bolt 60 defines an axis 94 of the locking cam disc 55 about which the locking cam disc 55 can be swiveled, as outlined below in further detail. The bolt 60, which connects the locking cam disc 55 with the first end 13 of the deformation member 10, is guided in the guide recess 40 of the backrest fitting 35 and can be swiveled about the axis 94 of the locking cam disc 55.

The locking cam disc 55 is biased by means of a leg spring 52, of which a first leg 52' abuts against the second arm 48 of a backrest shift lever 45 and of which a second leg 52" engages in an opening in the locking cam disc 55 above the pivot 56 of the locking cam disc 55.

Furthermore, a stepped bolt 51 extends through the guide recess 40 above the above-mentioned bolt 60, wherein the stepped bolt 51 connects the backrest shift lever 45 on a first side (facing the vehicle door) of the backrest fitting 35 with the second end 14 of the deformation member 10 on the opposite second side of the backrest fitting 35. The stepped bolt 51 has an outer stub axle 51b which engages in an opening in the main body 46 of the backrest shift lever 45 and defines a pivot axis 93 for pivoting the backrest shift lever 45, and at the opposite end has an inner stub axle 51c at the front end of which there is formed a thread 51d which is screwed into a thread at the second end 14 of the deformation member 10. A flange 51a is formed between the two stub axles 51b, 51c of the stepped bolt 51, which secures the position of the stepped bolt 51 on the backrest fitting 35 in the vehicle transverse direction y and serves as a stop for the locking cam disc 55, as described in more detail below. The stepped bolt 51 is guided in the guide recess 40 of the backrest fitting 35 and the axis 93 defined by the stepped bolt 51 can be swiveled along the guide recess 40 of the backrest fitting 35. Furthermore, the backrest shift lever 45 can be swiveled around this axis 93, as shown below.

The backrest shift lever 45 has a circular main body 46, from which two arms 47, 48 protrude. At the front end of the first arm 47, a projection 49 of the backrest shift lever 45 extends vertically inwards, i.e. in the transverse direction y of the vehicle. The opposite second arm 48 serves to move the locking cam disc 55 against the backrest shift lever 45. The backrest shift lever 45 is biased against the backrest (not shown) by means of a leg spring 50. For this purpose, the leg spring 50 with its opening at the central spring section is located on the outer stub axle 51b of the stepped bolt 51, which thus defines a pivot axis of the leg spring 50. The first leg 50' of the leg spring 50 rests against the first arm 47 to press the projection 49 against the back of the backrest. The projection 49 on the first arm 47 of the backrest shift lever 45 thus always abuts directly against the rear of the backrest at the lower end of the backrest in order to feel the angular position of the backrest when swiveling about the axis 37 for adjustment of the inclination of the backrest. The second leg 50" is supported on a reference point of the first arm 38 of the backrest fitting 35.

At the lower end of the side part 30 of backrest there is a pivot axis 33 which is mounted in the opening 36 of the backrest fitting 35 so that the backrest can be swiveled about the axis 37 to adjust the inclination angle of the backrest.

The backrest fitting 35 itself is mounted by means of a stepped bolt 17, which passes through an opening at the rear end of the side parts 80 of the seat base 8 (see FIG. 4a), and a bushing 18, so that it can swivel about the main axis of rotation 92

The above-mentioned axes 92, 94 and 37 each extend parallel and spaced apart in the transverse direction y of the vehicle. Furthermore, the stepped bolt 51 defines an additional axis 93 for swiveling the backrest shift lever 45, which also extends in the transverse direction y of the vehicle and at a distance from the above-mentioned axes 92, 94 and 37.

Figure 4C:
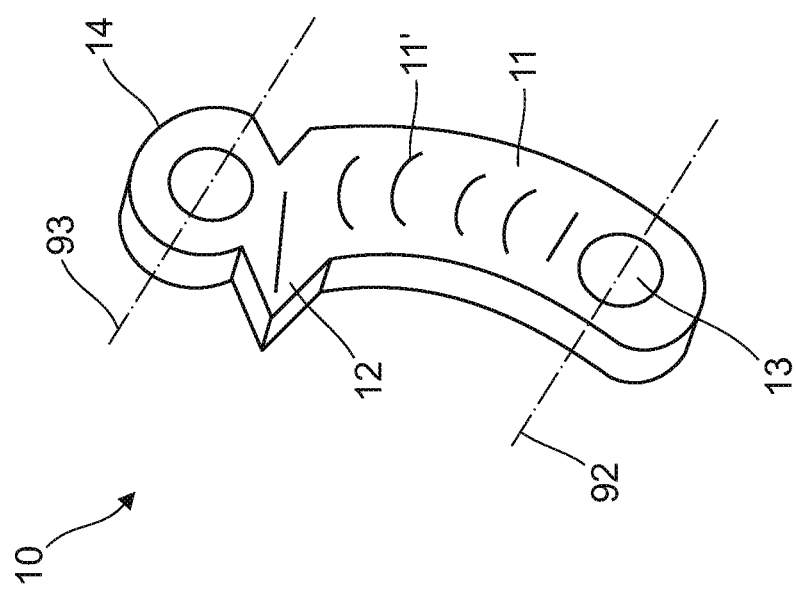
FIG. 4c shows a deformation member used in a vehicle seat according to the present invention.

The deformation member 10 is shown in FIG. 4c on a larger scale. The deformation member 10 is preferably made of a metal sheet and is overall slightly curved. It is formed by a main body 11 which is slightly bent (in the direction of travel) in the region of the second end 14, forming a projection 12 which may also extend in the transverse direction y of the vehicle. Openings at the two ends 13, 14 serve to connect the deformation member 10 with the locking cam disc 55 and the backrest shift lever 45 by means of bolts as outlined above. A plurality of folds or bends 11' are formed along the main body 11, which on the one hand provide for a certain elasticity of the deformation member 10, but which on the other hand also define a minimum force which is required to compress the deformation member 10 due to a force acting in the longitudinal direction of the main body 11, namely under plastic deformation of the folds or bends 11', as shown in FIG. 8c. According to the preset invention the mechanical characteristics of the main body 11 with the folds or bends 11' and its geometric shape define a triggering threshold for the mechanical coupling device, as described below in more detail.

As shown in FIG. 4b, the two bolts 51 and 60, which engage in the openings at both ends 13 and 14 of the deformation member 10 and serve to connect the deformation member 10, on the one hand, with the locking cam disc 55 and, on the other hand, with the backrest switch lever 45, are together slidably guided in the recess 40 of the backrest fitting 35.

The backrest fitting 35 together in cooperation with the deformation member 10, with the locking cam disc 55 and with the backrest shift lever 45 form the mechanical coupling device 6 shown in FIG. 4b which serves for mechanically coupling the backrest with the assembly 7 for adjustment of the inclination of the seat member 2 in the event of a crash. The function of this mechanical coupling device is described in more detail below with reference to FIGS. 5a to 5c, which show the positional relationship of the locking cam disc 55 and the deformation member 10 for locking and releasing the deformation member 10 as a function of the inclination of the backrest 3 in a vehicle seat according to the present invention. The backrest erection angle ($\alpha$) is indicated by the angles $\alpha 1$ to $\alpha 3$.

The basis of the operating principle of the mechanical coupling device is a load-dependent sequence of movements in several stages, which is triggered and driven by the front-crash-induced acceleration of the vehicle occupant and by the resulting reaction forces of the belt and seat system. The mechanism of action is automatically activated as soon as a certain inclination of the backrest is exceeded and is automatically reversible as soon as this inclination of the backrest (reclining seat) is left again and as long as the deformation member has not been plastically deformed due to a crash.

Here, the basic assumption is that the vehicle seat is preferably a belt integral seat or similar, with a belt exit point attached to or integrated into the backrest in the upper backrest area. At this belt exit point, the reaction forces of the belt and seat system intervene in the event of a crash. Due to the relatively large distance to the axis 37 for adjustment of the inclination o of the backrest, a maximum torque can thus be achieved to raise or erect the backrest from a resting or reclining position.

FIG. 5a shows the vehicle seat with the backrest 3 swiveled far back into a resting or reclining position with a relatively small backrest erection angle $\alpha 3$. The projection 49 of the backrest shift lever 45 is located at the rear of the backrest 3 in order to mechanically sense its angular position. In this position, the backrest shift lever 45 pushes or swivels the locking cam disc 55 forwards in the direction of travel F. The backrest shift lever 45 then moves the locking cam disc 55 forwards in the direction of travel F. In this position, the locking cam disc 55 is pressed or swiveled forwards by the backrest shift lever 45 in the direction of travel F. The deformation member is not locked in this state. The backrest erection angle $\alpha$ of the backrest 3 can be freely varied. A distance D is defined between the outer contour of the locking cam disc 55 and the stepped bolt 51 (more precisely between the outer contour of the locking cam disc 55 and the flange 51a of the stepped bolt 51 (see FIG. 4b)).

Referring to FIGS. 5a to 5c, hereinafter the function of the mechanical coupling device in the event of a frontal crash will be described in more detail. Here it is assumed that the vehicle seat is initially in the resting or reclining position shown in FIG. 5a with a relatively small backrest erection angle $\alpha 3$. Due to the forces during the frontal crash, the occupant's body is accelerated forward in a first short free flight stage until the belt system responds and is tightened. From this point on, the occupant's body acts on the belt system (which may already have been pre-tensioned), with the upper body acting most strongly in front of the upper belt entry point of the diagonal belt. The belt transfers the reaction force of the upper body at the upper belt entry point to the upper backrest structure. The backrest 3 is now pulled forward or upward by the belt reaction force from its flat resting or reclining position. The backrest erection moment increases rapidly with increasing backrest erection angle $\alpha 3$, as explained above with reference to FIG. 3.

After passing a low reaction threshold the deformation member is deformed. For example it is bent or plastically deformed in the region of the projection 12 (see FIG. 4c), as shown in FIG. 8c. Due to its geometrical shape and the mechanical characteristics of the main body 11 with the folds or bends 11', according to the present invention the deformation member is designed in such a manner that it can withstand normal drive/operating forces of the backrest, in particular also forces such as typically occur for comfort adjustment of the vehicle seat and backrest 3, and that it initially deforms 'slightly' under a much higher crash load in order to support the movement for erecting the backrest (caused by the reaction vector) and to start the kinematic system dynamically.

After the dynamic start of the entire system (movement for erecting the backrest), the second deformation region of the deformation member with higher deformation resistance is reached. In this stage, the folds or bends 11' in the main body 11 of the deformation member 10 are increasingly plastically deformed, which on the one hand reduces crash energy and on the other hand results in a shortening of the length of the deformation member and which results in the locking cam disc 55, which is pivoted forwards and thus has a distance from the upper stepped bolt 51, being displaced upwards until its cam contour abuts the upper stepped bolt 51, as described in more detail below with reference to FIGS. 8a to 10c. This condition is illustrated in FIG. 5b. From this point on the deformation member 10 is locked. The folds or bends 11' in the main body 11 of the deformation member 10 are practically completely compressed or the deformation member 10 is plastically deformed to such an extent (see FIG. 8c) that the length of the deformation member 10 can no longer be further reduced. Rather, it is locked and bridged by the locking cam disc 55, so that the force flow now continues via the locking cam disc 55.

This results in an ever stronger proportion of the reaction vector in the direction of travel due to the upright backrest 3, i.e. the belt reaction force has a stronger effect than the proportion of the forward movement of the backrest 3. From this stage on, there are two system reactions.

The forward movement of the backrest 3 is already more strongly braked by the second deformation region of the deformation member, which also leads to a certain energy reduction relative to the vehicle occupant and the belt force limitation. However, the forward movement of the backrest 3 is still in progress in this stage, whereby high momentum or forces occur due to the high mass of the backrest 3 with the vehicle occupant coupled to it.

In this stage, the transmission nose at the front actuating end 43 of the backrest fitting 35 (see FIG. 4*a*) is finally swiveled further forward until it comes into contact with the rear end of the bracket 70 for inclining seat pan and actuates it. Due the transmission nose at the front actuating end 43 of the backrest fitting 35 in front of the front recliner screw-on point 36 (which represents the pivot of the crash kinematics of the recliner assembly), the remaining movement of the backrest finally results in a pivoting movement of the bracket 70 for inclining seat pan. This pivoting movement of the bracket 70 for inclining seat pan about the pivot axis 90 again initiates a lifting of the bracket 70 for inclining seat pan in the front region 20' of the seat pan 20.

Lifting the bracket 70 for inclining seat pan in the front region 20' releases an embracing locking of the seat pan 20 in its front coupling region as described in FIGS. 7*a* and 7*b* above.

In this stage, the seat pan 20 is not yet raised. At the end of this stage, the condition according to FIG. 7*b* is reached in which the locking of the locking claw 75 is released.

The further progressive lifting of the bracket 70 for inclining seat pan in the front region finally leads to the bracket 70 for inclining seat pan coming into contact with the underside of the seat pan 20, which then leads to a resulting lifting of the seat pan 20 in the front region 20' and thus to the steadily increasing formation of an impact ramp or an anti-submarine ramp of the seat pan 20 relative to the occupant's upper leg area.

As the erecting movement of the backrest and upper body progresses, the belt system acts more and more strongly on the occupant's upper body and at the same time the compression effect on the spinal column decreases.

As the front region 20' of the seat pan 20 is progressively raised, it has an increasingly braking effect on the occupant's thighs and at the same time prevents submersion under the belt ('anti-submarining').

Figure 5D:
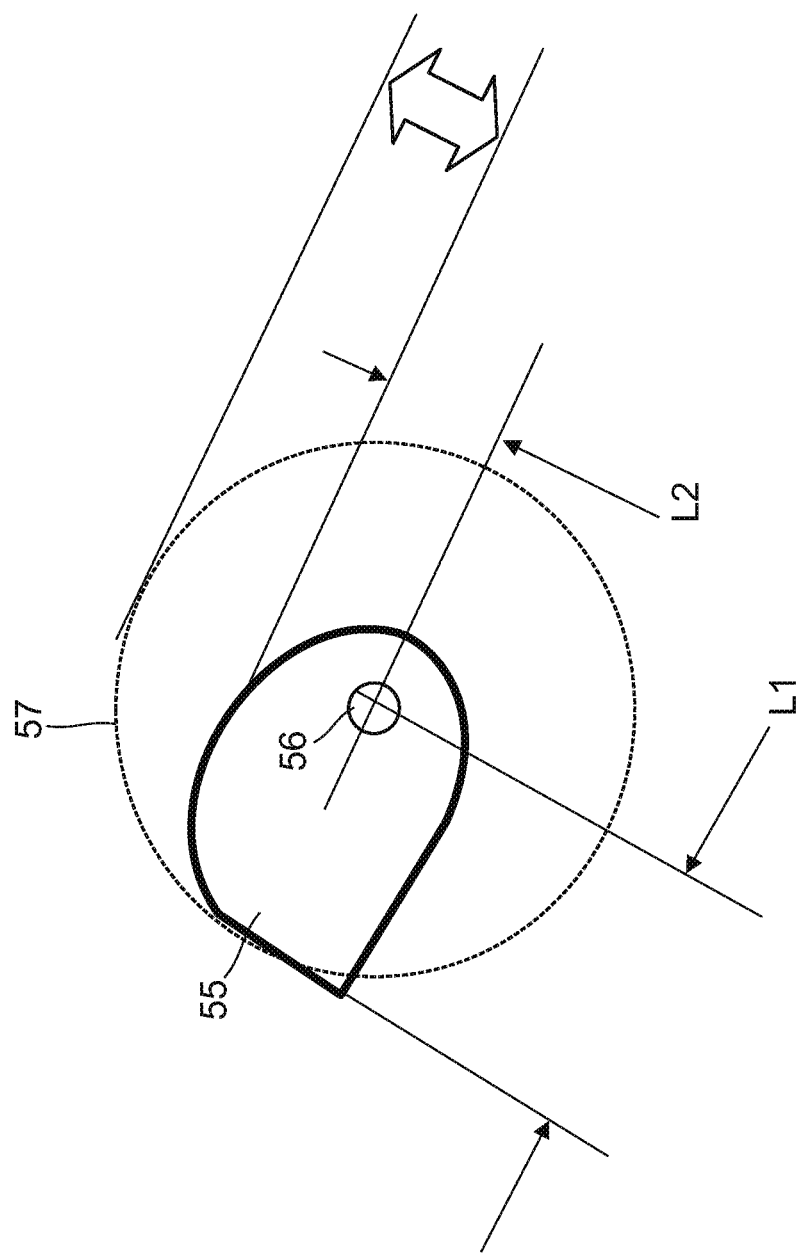
FIG. 5d shows the cam track described by the locking cam disc for a vehicle seat according to the present invention.

In the comfort adjustment of the backrest 30, the deformation member is locked by the locking cam disc 55, as shown in FIGS. 5*b* and 5*c*. The locking cam disc 55 inscribes a cam track 57 as shown in FIG. 5*d* during its pivoting movement about the axis 56. The length of the cam disc 55 is greater in a first direction (length L1) than in a second direction perpendicular to the first direction (length L2). If the locking cam disc 55 is thus inclined downwards in the direction of travel, the locking cam disc 55 defines an opening dimension, as indicated by the double arrow in FIG. 5*d*. In this state the deformation member is not locked. However, if the locking cam disc 55 is swiveled back due to the kinematics in the overall system, the opening dimension is negligible, as indicated by the dimension arrows in FIGS. 5*b* and 5*c*, and the deformation member is locked.

FIG. 6*a* shows an enlarged partial side view of the backrest fitting of FIG. 4*a* for a backrest erection angle Γ1 of the backrest 3. In this position the assembly 7 for adjustment of the inclination of the seat member 2 is not activated because the front actuating end 43 of the backrest fitting 35 does not press against the rear end of the bracket 70 for inclining seat pan but is disposed at a distance from it.

In the event of a crash, the backrest 3 swivels further forwards about the axis 92 until the backrest erection angle γ2 of the backrest 3 is finally reached and exceeded and the front actuating end 43 of the backrest fitting 35 comes into contact with the rear end of the bracket 70 for inclining seat pan and presses it downwards, which initially causes the locking of the seat member to be released (see also FIGS. 7*a* and 7*b*) and finally, as shown in FIG. 6*b*, causes the front region of seat member 2 to swivel upwards, as described above.

FIG. 8*b* shows the mechanical coupling device in the state according to FIG. 5*a* when there is a distance D between the outer contour of the locking cam disc 55 and the stepped bolt 51 (more precisely between the outer contour of the locking cam disc 55 and the flange 51*a* of the stepped bolt 51 (see FIG. 4*b*)).

FIG. 8*a* shows the mechanical coupling device in the state according to FIG. 5*a* when the distance between the outer contour of the locking cam disc 55 and the stepped bolt 51 (more precisely between the outer contour of the locking cam disc 55 and the flange 51*a* of the stepped bolt 51 (see FIG. 4*b*)) is negligible.

FIG. 8*c* shows the mechanical coupling device after a crash-induced plastic deformation of the deformation member. In this condition the main body of the deformation member is plastically deformed in the region 11", as indicated by the folds extending in the transverse direction of the vehicle. The axis 94 of the locking cam disc 55 is offset upwards by a length D relative to the position 94' of this axis before the deformation of the deformation member, which also applies to the position of the axis 37 for adjustment of the inclination of the backrest relative to the position of this axis 37 before the deformation of the deformation member. In this condition the distance between the outer contour of the locking cam disc 55 and the stepped bolt 51 (more precisely between the outer contour of the locking cam disc 55 and the flange 51*a* of the stepped bolt 51 (see FIG. 4*b*)) remains negligible. Due to the shortening of the deformation member by the distance D, the backrest fitting 35 swivels forward further, which causes the assembly 7 for adjustment of the inclination of the seat member 2 to be actuated via the front actuating end 43 of the backrest fitting 35, as described above.

Figure 9A:
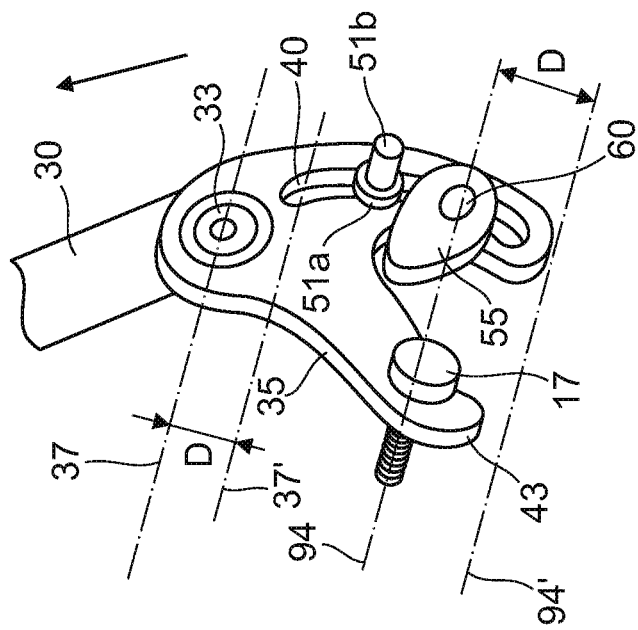
FIG. 9a shows in a perspective partial view schematically the state of the mechanical coupling device in the state according to FIG. 5b.
Figure 9B:
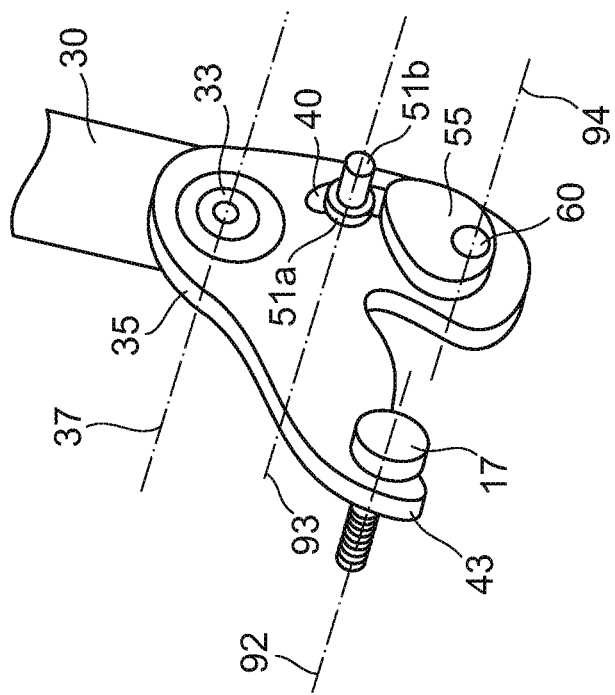
FIG. 9b shows in a perspective partial view schematically the state of the mechanical coupling device after deformation of the deformation member.

FIG. 9*a* shows the state of the mechanical coupling device in the state according to FIG. 5*b* when the flange 51*a* of the stepped bolt has come into contact with the outer contour of the locking cam disc 55. The deformation of the deformation member causes the backrest fitting 35 and the backrest to swivel further forward. This causes the axis 60 of the locking cam disc 55 and the stepped bolt 51 to move further in the guide recess 40 of the backrest fitting 35 by the distance D.

Figure 10C:
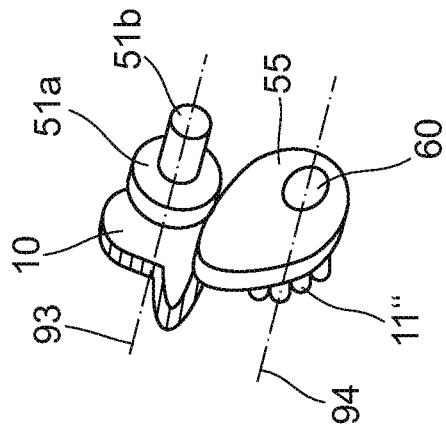
FIGS. 10b-10c show the state of the mechanical coupling device before and after deformation of the deformation member in the event of a crash.
Figure 10B:
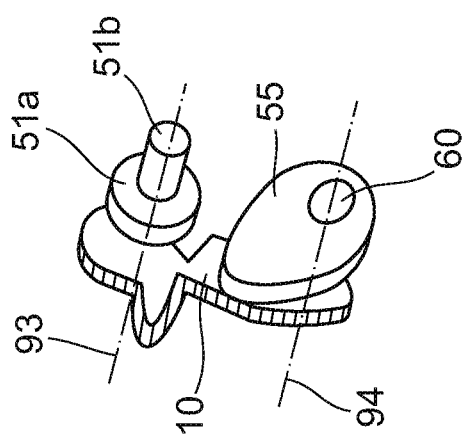

FIGS. 10*b* and 10*c* show the state of the mechanical coupling device before and after deformation of the deformation member in the event of a crash, wherein the backrest fitting is omitted for reasons of clarity.

The condition according to FIG. 10*b* corresponds to the condition according to FIG. 8*b* or FIG. 5*a* if there is a distance D between the outer contour of the locking cam disc 55 and the stepped bolt 51 (more precisely between the outer contour of the locking cam disc 55 and the flange 51*a* of the stepped bolt 51 (see FIG. 4*b*)).

Figure 10A:
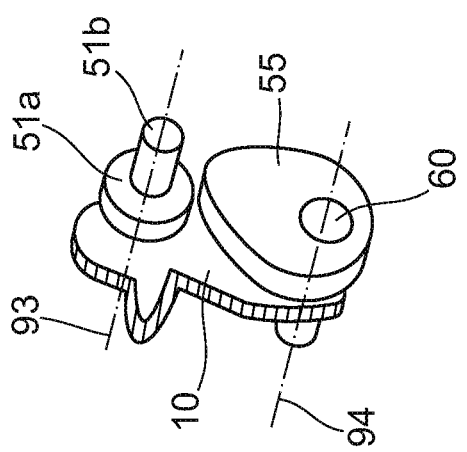
FIG. 10a shows the condition of the mechanical coupling device in the condition according to FIG. 5b.

The condition according to FIG. 10*a* corresponds to the condition according to FIG. 8*a* or FIG. 5*b* if the distance D between the outer contour of the locking cam disc 55 and the stepped bolt 51 (more between the outer contour of the locking cam disc 55 and precisely the flange 51*a* of the stepped bolt 51 (see FIG. 4*b*)) is negligible.

The condition according to FIG. 10*c* corresponds to the condition according to FIG. 8*c* or FIG. 5*c*, after plastic deformation of the deformation member in the region 11".

As can be concluded from the above description, the function of the overall mechanism is composed of three successive and functionally integrated individual mechanisms coupled to each other.

The first individual mechanism is formed by the backrest recliner 30 including the backrest position switching unit 45 and the deformation member 10 and defines a kinematic main fulcrum.

The second individual mechanism is in the coupling of the pivot fitting 35 with the bracket 70 for inclining seat pan with the function of raising the front region 20' of the seat pan 20 and a kinematic movement transfer.

The third individual mechanism is in the coupling of the bracket 70 for inclining seat pan including a release unit (locking claw 75) for releasing the further lifting of the front region 20' of the seat pan 20. This third individual mechanism has the function of a safety lock in case of a front crash in normal position and of a rear crash in normal position.

The first mechanism (recliner assembly) also has the main function of switching the system on and off depending on the angular position of the backrest (reclining position—ON and normal driving position—OFF). This means that the vehicle seat can be used in a normal driving position together with crash protection systems in the tried and tested manner known from the prior art.

These three individual mechanisms can be individually adapted both in their force/stroke characteristics and in their chronologically successive chains of action. In this way, the overall system occupant—seat belt—seat—vehicle unfolds its optimum overall effect.

This means that the overall system is doubly protected against unfavorable movement in the normal seat position both in the event of a front crash and in the event of a rear crash, and the backrest position automatically activates the overall system with all kinematic sequences in the event of a crash in the resting or reclining position, as described above.

According to the present invention, all three individual mechanisms can be integrated into conventional seat structures. Assuming that the backrest side of the belt entry point of integral belt seats is structurally stronger (usually on the door side), the mechanism is also advantageously mounted on this side together with its main active components. A tunnel-side embodiment (facing away from the vehicle door and towards the interior of the passenger cell of the vehicle) is also possible—but then requires a slightly higher effort and has a different triggering threshold.

As will become apparent to the person skilled in the art when studying the above description, an electric adjustment of the inclination of the backrest and/or of the seat member can also be implemented in a vehicle seat according to the present invention. However, care should be taken to ensure that the coupling of the drive or transmission provided for this purpose with the backrest and/or the seat member can be released or decoupled sufficiently quickly in the event of a crash, e.g. by breaking away a breakaway part.

LIST OF REFERENCE NUMERALS 1 vehicle seat
2 seat member
3 backrest
4 seat belt
5 upper belt exit point
6 mechanical coupling device
7 assembly for adjustment of the inclination of the seat member
8 seat base
10 deformation member
11 main body
11' folding/bend
11" plastically deformed region of deformation member 10
12 projection
13 first end
14 second end
17 stepped bolt
18 bushing
20 seat pan
20' front part of seat pan 20
21 connecting member
22 pivot
30 side part of backrest
31 upper traverse bracket
32 lower traverse bracket
33 stub axle/recliner
35 backrest fitting/backrest adapter
36 opening
37 axis for adjustment of inclination of backrest axis for adjustment of inclination of backrest before deformation of deformation member 10
38 first arm of backrest fitting 35
39 second arm of backrest fitting 35
40 guide recess
41 recess
42 recess
43 front actuating end of backrest fitting 35
45 backrest shift lever
46 main body
47 first arm of backrest shift lever 45
48 second arm of backrest shift lever 45
49 traverse arm
50 swivel spring for backrest shift lever 45
50' leg of swivel spring 50
50" leg of swivel spring 50
51 stepped bolt
51a flange
51b outer stub axle
51c inner stub axle
51d threaded bolt
52 swivel spring for locking cam disc
52' leg of swivel spring 52
52" leg of swivel spring 52
55 locking cam disc
56 pivot of locking cam disk 55
57 cam track of locking cam disk 55
60 bolt
70 bracket for inclining seat pan
71 pivot
72 traverse bar
73 traverse bar
74 beam
75 locking claw
80 side part
81 front connecting foot
82 rear connecting foot
83 traverse bar
90 axis for adjustment of inclination of seat member
91 axis of traverse bar 73
92 main axis of rotation
93 axle of back shift lever 45
94 axle of locking cam disc 55
94' axle of locking cam disc 55 before deformation of deformation member 10

REFERENCE NUMERALS RELATING TO PRIOR ART 100 vehicle seat
101 seat member 102 backrest
103 seat belt
104 upper belt exit point
D distance
F direction of travel
F' direction of travel
P person
P' person
P1 stage 1
P2 stage 2
L1 large length of locking cam disc 55
L2 small length of locking cam 55
Y transverse direction of vehicle

What is claimed is:

1. A vehicle seat, comprising a seat member and a backrest, wherein
a belt connection is attached to or integrated into an upper end of the backrest,
the backrest can be adjusted about an axis extending in parallel with a vehicle transverse direction into a resting or reclining position for adjusting the inclination of the backrest, and
an assembly for adjustment of the inclination of the seat member is provided so that, in the event of a collision, the seat member with a front region facing away from the backrest can be pivoted upwards about an axis extending parallel to the transverse direction of the vehicle for adjusting of the inclination of the seat member;
the vehicle seat further comprising a mechanical coupling device for coupling the backrest to the assembly for adjustment of the inclination of the seat member in the event of a collision, wherein
the mechanical coupling device defines a triggering threshold,
(a) such that the backrest is decoupled from the assembly for adjustment of the inclination of the seat member under normal operating conditions when the triggering threshold is not exceeded; and
(b) such that in the event of a collision, when the triggering threshold is exceeded, the backrest is pivoted forwards and is finally coupled via the mechanical coupling device to the assembly for adjustment of the inclination of the seat member, so that a further pivoting of the backrest forwards triggers the assembly for adjustment of the inclination of the seat member and causes the front region of the seat member facing away from the backrest to pivot upwards about the axis.

2. The vehicle seat as claimed in claim 1, wherein the mechanical coupling device comprises a deformation member having mechanical characteristics which define the triggering threshold, wherein the deformation member is plastically deformed in the event of a collision if the triggering threshold is exceeded.

3. The vehicle seat as claimed in claim 2, wherein the deformation member is plastically deformable in the event of a collision if the triggering threshold is exceeded until the backrest is rigidly coupled to the assembly for adjustment of the inclination of the seat member.

4. The vehicle seat as claimed in claim 2, wherein
a first end of the deformation member is coupled to the axis of a locking cam disk,
a second end of the deformation member is coupled to an axis of a backrest shift lever which follows an adjustment of the inclination of the backrest; and
the axes are guided movably and parallel to one another in a recess of a backrest fitting so as to extend in the transverse direction of the vehicle.

5. The vehicle seat as claimed in claim 4, wherein the backrest shift lever is biased against the backrest and the locking cam disc is biased into a release position in which the locking cam disc releases the axle of the backrest shift lever and the deformation member, wherein the backrest shift lever causes the locking cam disc to press against the axis of the backrest shift lever to lock the deformation member when a minimum inclination angle of the backrest is exceeded.

6. The vehicle seat as claimed in claim 4, wherein the axis for adjustment of the inclination backrest is mounted in an opening at a first end of the backrest fitting spaced apart from a main axis of rotation of the backrest fitting.

7. The vehicle seat as claimed in claim 6, wherein an actuating end for actuating the assembly for adjustment of the inclination of the seat member is provided at a second end of the backrest fitting facing away from the opening, the actuating end being spaced apart from the assembly for adjustment of the inclination of the seat member under normal operating conditions when the triggering threshold is not exceeded.

8. The vehicle seat as claimed in claim 1, wherein under normal operating conditions, when the triggering threshold is not exceeded, a locking of the seat member with a seat base is locked.

9. The vehicle seat as claimed in claim 8, wherein, when the triggering threshold is exceeded, the locking of the locking of the seat member with the seat base is released in a first stage when the front region of the seat member facing away from the backrest is pivoted upwards, and wherein the locking of the seat member with the seat base is released in a stage following the first stage when the inclination of the backrest is adjusted further forwards.

10. The vehicle seat as claimed in claim 9, wherein the locking of the seat member with the seat base is effected by a locking claw which engages in a transverse bar extending in the transverse direction of the vehicle, wherein the locking of the locking of the seat member with the seat base is effected by a portion at a forward end of the assembly for adjustment of the inclination of the seat member which, under normal operating conditions when the triggering threshold is not exceeded, presses against a portion of the locking claw or is located at a small distance from the portion of the locking claw.

11. The vehicle seat as claimed in claim 1, wherein the mechanical coupling device is provided on a first side of the vehicle seat facing an outer side of the vehicle and on which the belt connection is fixed to or integrated into the backrest.

12. The vehicle seat as claimed in claim 11, further comprising a second mechanical coupling device of identical construction provided on a second side of the vehicle seat opposite the first side of the vehicle seat, the triggering thresholds of the two mechanical coupling devices being different.

* * * * *